Patented July 31, 1945

2,380,394

UNITED STATES PATENT OFFICE 2,380,394

TREATMENT OF DRYING OILS

Henry G. Berger, George S. Crandall, and John F. Socolofsky, Woodbury, N. J., assignors to Socony-Vacuum Oil Company, Incorporated, a corporation of New York No Drawing. Application June 5, 1942,
Serial No. 445,970

8 Claims. (Cl. 106—222)

This invention relates to a process for conversion of drying oils to bodied or polymerized products suitable for preparation of liquid coating compositions such as varnishes and the like.

It has been common practice in the art for many years to body drying oils, such as tung oil and perilla oil, by cooking at 400° F. to 600° F. for a sufficient period of time. This cooking may be conducted before or after addition of resins such as ester gum. The less active drying oils require extended heating time for completion of such treatment. Excessively long heating times or excessively high cooking temperatures tend to have substantial deleterious effects on the drying properties of the treated oil and may result in gelation. Unduly long drying periods and inferior films are normally found in products from bodying of the less active drying oils. The high-grade drying oils, such as tung and perilla oils, may be cooked to the desired body without seriously affecting their value as film-forming agents. However, even the better oils are affected by excessive heat treatment.

According to our present process, drying oils are bodied catalytically by treatment in the presence of a polymerization catalyst to produce bodied oils suitable for the preparation of liquid coating compositions. It is known that a variety of polymerization catalysts will effect polymerization of drying oils, and such processes have been proposed for the manufacture of compositions to be used as lubricants. These prior processes involve catalytic polymerization followed by removal of the catalyst when the desired stage of polymerization has been reached. The products so produced are not suitable for use in varnishes and other liquid coating compositions since the films, if any, formed therefrom are not resistant to frosting and have other disadvantages.

Processes for the production of valuable catalytically bodied oils are described in Patent No. 2,316,187, issued April 13, 1943, to Malcolm F. Pratt and Henry G. Berger. It is there disclosed that if the catalytic bodying reaction is carried out at temperatures of about 300° F. or above, bodied oils of suitable properties are obtained. We have now discovered that catalytic bodying may be satisfactorily conducted at lower temperatures, good results being obtained at room temperature, if the reaction is conducted in the manner described below.

The present invention is based on the discovery that satisfactory varnishes can be made from drying oils catalytically bodied at temperatures below 300° F. if a sufficient degree of bodying is attained and the action of the catalyst is then arrested, whereupon the oil may be blended with resins, thinned and driers and the like added. In general, a body of at least Z-6 (Gardner-Holdt scale) should be attained before arresting the action of the catalyst. That is, for most purposes, the oil should be catalytically bodied to a stage between Z-6 and gelation by catalytic action. If the treated oil has a body substantially below Z-6 when catalytic bodying is arrested, there is a strong possibility that films formed therefrom will become frosted. The said prior patent of Pratt and Berger described varnishes prepared from drying oils bodied catalytically at temperatures below 300° F. and pointed out that these varnishes formed frosted films. The experimental work of the present inventors provides an explanation of this finding and provides a means by which the noted disadvantages may be overcome. Oils bodied catalytically at the lower temperatures (below 300° F.) may not be reacted to a sufficient extent to provide the desired body because additional bodying accompanies the necessary heating to dissolve the resin. Varnishes can be made from oils bodied to not more than Z-5 (Gardner-Holdt scale) by low temperature catalysis. If a greater body is achieved by catalytic means, gelation occurs during heating to dissolve the resin unless steps described herein are taken. But oils bodied to Z-5 catalytically form varnishes that give frosted films. According to this invention an inactivator for the catalyst is added when a drying oil containing a polymerization catalyst has achieved the desired body. This gelation inhibitor makes it possible to use oils bodied to an extent sufficient that the varnishes prepared therefrom will form hard, lustrous, transparent films; i. e. substantially greater than Z-5. Thus, an oil may be allowed to body catalytically until it has reached a body of more than Z-6+ or until gelation is imminent before addition of inhibitor and subsequent blending with resin. By this procedure varnishes of body A to K at 60% nonvolatile have been produced and after addition of the conventional driers, the resultant films dried clear and hard.

In practicing the invention, we use any of the known polymerization catalysts suitable for the purpose from the standpoint of converting the oil to the desired body in a reasonable time when present in concentrations which will not adversely affect films formed therefrom. This is a practical limitation on the process from a commercial standpoint, but it will be apparent to those skilled in the art that relatively less active catalysts may be used where their presence in large quantities will not render the films unfit for the intended purpose or where extremely long polymerization periods are not of major importance. Recognizing that the relative activity of the catalyst may be compensated by concentration thereof, the process involves four mutually dependent variables, namely; time, temperature, relative reactivity of the drying oil and catalyst concentration (including catalyst activity).

Obviously, any process within the scope of the invention must involve adjustment of the several variables and critical or optimum conditions generally applicable are impossible to formulate. In general, we prefer to use the more active polymerization catalysts, for example, those of the Friedel-Crafts type of metal halides, with particular preference for boron fluoride; although many other catalysts, such as hydrogen fluoride, titanium tetrachloride and other well-known polymerization catalysts may be used to advantage.

The inactivators or inhibitors are of varied nature. Water is an excellent inactivator and is advantageously used in amounts on the order of 1% based on the weight of the oil being treated. Ammonia, calcium carbonate, pyridine, quinoline, isoquinoline, tri-amyl amine and other amines are also valuable for the purpose of inactivating the catalyst. Much research has been conducted on catalysis of polymerization reactions in general and many agents are known which have the effect of rendering polymerization catalysts inactive. The theory has been proposed that the inactivators are compounds having a greater tendency to form addition compounds with the catalyst than does the material being polymerized. The choice of a particular inactivator must be determined by a number of factors including nature and concentration of catalyst and use to be made of the bodied oil. The driers normally employed in varnishes are also good inactivators but these are preferably used only where resin is dissolved in the oil before bodying.

Our process may be exemplified by the catalytic bodying of oiticica oil and of an oiticica oil-ester gum varnish base with boron fluoride at room temperature.

The oil is uniformly mixed with the catalyst under non-gelling conditions. The catalyzed oil is collected in storage containers and allowed to stand at atmospheric temperatures until the desired degree of polymerization is attained. No agitation nor dilution of the reaction materials is required. The time required for the oil to attain the desired body is naturally dependent upon the activity of the oil being treated, the concentration of the catalyst and the temperature of storage. For illustrative purposes, the following table gives the times required for raw oiticica oil catalyzed with various quantities of boron fluoride to attain a body of Z-5 on Gardner-Hodt scale (=98.5 poises) and to reach gel stage when stored at atmospheric temperature.

| Concentration BF₃, percent | Time to reach Z-5, days | Time to gel, days |
| --- | --- | --- |
| 0.05 | 28.6 | 38.0 |
| 0.063 | 25.0 | 37.0 |
| 0.079 | 5.7 | 18.0 |
| 0.104 | 4.0 | 6.0 |
| 0.154 | 3.2 | 5.0 |
| 0.18 | 1.1 | 1.9 |

Thus, the concentration of catalyst may be so chosen that the bodying time is compatible with other operating conditions. Although concentrations as low as 0.05% require a reaction time which might not be excessive under some conditions, the more practical range of concentrations appear to be from 0.075% to 0.2% for this oil at room temperature.

When the desired degree of polymerization has been attained as may be determined by periodic test of the body of the reaction mixture, the reaction is stopped. Instead of resorting to the more drastic and complex procedures of dilution and extraction as practiced in the polymerization of oils for lubrication purposes, we stop the catalytic action by the addition of small quantities of inactivators. Examples of effective inactivators are water (1%), ammonia, quinoline or isoquinoline (0.3%), and amines. Water, when used under these conditions, does not destroy the catalyst as is evidenced by the fact that it may be expelled by heating, thus restoring the activity of the catalyst.

When applied to the catalytic bodying of varnish base, the resin and oil are blended with just sufficient heating to attain a homogeneous mixture (top temperature approximately 300° F.) and then subjected to the same type of treatment as used for the treatment of the drying oil.

The products obtained by this process may be used as bodied oils in the manufacture of varnishes. They may be used as prepared or, after the addition of inactivator, they may be stored and utilized as desired.

Our process is superior to the prior art in that it is easily controlled; the concentration of catalyst used is not critical and may be varied over rather wide ranges; no diluent is required and no complicated after-treatment is required.

*Example I*

Raw oiticica oil 99.82 parts and boron fluoride 0.18 part were thoroughly mixed in a mixing unit of the type described in Patent No. 2,238,864, having a suitable injection valve. The catalyzed oil was placed in a closed container and stored at prevailing room temperature (max. 92° F., min. 62° F.) and the body of the oil determined at frequent intervals with a Gardner-Holdt viscometer. The body of the oil immediately after preparation was Y (=17.6 poises), after 8 hours Z-3 (=46.3 poises), after 14 hours Z-4 (=63.4 poises), after 25 hours Z-5 (=98.5 poises), after 37 hours Z-6, and after 45.5 hours gelation took place.

*Example II*

Raw oiticica oil 99.92 parts and boron fluoride 0.08 part were mixed as in Example I. The oil was stored, as above, at prevailing temperatures which ranged from a minimum of 69° F. to a maximum of 101° F. This oil attained a body of Z-5 (=98.5 poises) in 5 days and a body of Z-6 (=148 poises) in 8 days.

*Example III*

A varnish base consisting of 33.3 parts of ester gum and 66.6 parts of raw oiticica oil was heated for 15 minutes from 74° F. to 267° F. to completely dissolve the ester gum. This mixture of resin and oil was then mixed uniformly with 0.1 part of boron fluoride in the mixing equipment referred to in Example I. After storage for 7 days, a sample of the product was thinned with petroleum thinner and suitable driers added (0.76% Pb, 0.051% Mn, and 0.069% Co, based on oil content). A varnish having very desirable properties was obtained in this way as shown by the following characteristics:

Body at 50% non-volatile _____ C (Gardner-Holdt scale)
Drying time:
  Dust free _____ hours __ 1¼
  Tack free _____ do ____ 2½
  Hard _____ Overnight
Film _____ Hard
Water resistance _____ Excellent

Example IV

To oiticica oil containing 0.1% boron fluoride was added 0.3% isoquinoline at body Z–1 (=27.0 poises). After 134 days storage, the body of this sample was still Z–1. A sample of the same catalyzed oil without addition of an inactivator gelled in 3 days.

Example V

To oiticica oil, containing 0.08% boron fluoride, was added 1.0% of water at an oil body of Z–1+ and after 30 days it was Z–2. After 133 days the body of this sample was Z–2+. A sample of the same oil without the addition of an inactivator gelled in 5 days. The slight increase in body over the extended storage period may have been due to loss of water by evaporation.

Example VI

Raw oiticica oil 99.92 parts and boron fluoride 0.08 part were thoroughly mixed as described in Example I. The oil was stored at room temperature until a body of Z–6 was obtained at which time 0.3% triamylamine was added. A 25 gallon varnish was then made from this catalytically bodied oil by dissolving one part ester gum in two parts oil. After thinning to 60% non-volatile with petroleum thinner and adding 0.75% Pb., 0.05% Mn, 0.075% Co (based on oil content) the resultant varnish had a body of J and dried dust free in 1 hour, tack free in 1¾ hours and hard over night. The dried film was clear and hard.

We claim:

1. The process which comprises polymerizing oiticica oil containing boron fluoride at a temperature not substantially above about 300° F. to a desired body and arresting polymerization of said oil by addition thereto of a small quantity of quinoline.

2. The process which comprises polymerizing oiticica oil containing boron fluoride at a temperature not substantially above about 300° F. to a desired body and arresting polymerization of said oil by addition thereto of a small quantity of isoquinoline.

3. The process which comprises polymerizing a drying oil containing boron fluoride at a temperature not substantially above about 300° F. to a desired body and arresting polymerization of said oil by addition thereto of a small quantity of an inactivator for said boron fluoride selected from the group consisting of quinoline and isoquinoline.

4. The process which comprises polymerizing a drying oil containing a Friedel-Crafts type polymerization catalyst at a temperature not substantially above about 300° F. to a desired body and arresting polymerization of said oil by addition thereto of a small quantity of quinoline.

5. The process which comprises polymerizing a drying oil containing a Friedel-Crafts type polymerization catalyst at a temperature not substantially above about 300° F. to a desired body and arresting polymerization of said oil by addition thereto of a small quantity of isoquinoline.

6. The process which comprises polymerizing a drying oil containing a Friedel-Crafts type polymerization catalyst at a temperature not substantially above about 300° F. to a desired body and arresting polymerization of said oil by addition thereto of a small quantity of an inactivator for said catalyst selected from the group consisting of quinoline and isoquinoline.

7. The process which comprises polymerizing a drying oil containing a polymerization catalyst of the Friedel-Crafts type at a temperature not substantially above about 300° F. to a body not substantially lower than Z–6 (Gardner-Holdt scale) and arresting polymerization of said oil before gelation thereof occurs by addition thereto of an inactivator for said catalyst selected from the group consisting of quinoline and isoquinoline.

8. In a process of preparing a liquid coating composition, the steps which comprise polymerizing a drying oil containing a polymerization catalyst of the Friedel-Crafts type at a temperature not substantially above about 300° F. to a body not substantially lower than Z–6 (Gardner-Holdt scale), arresting polymerization of said oil before gelation thereof occurs by addition thereto of an inactivator for said catalyst selected from the group consisting of quinoline and isoquinoline and thereafter adding resin, thinner and dried to form the said composition.

HENRY G. BERGER.
GEORGE S. CRANDALL.
JOHN F. SOCOLOFSKY.